No. 683,401. Patented Sept. 24, 1901.
W. P. HOUZE.
CARBURETER.
(Application filed Oct. 16, 1900.)
(No Model.) 2 Sheets—Sheet 1.

Witnesses
H. S. Austin
Chas. W. Parker

Inventor
William P. Houze,
by R. S. Bacon
Attorney

No. 683,401. Patented Sept. 24, 1901.
W. P. HOUZE.
CARBURETER.
(Application filed Oct. 16, 1900.)
(No Model.)
2 Sheets—Sheet 2.
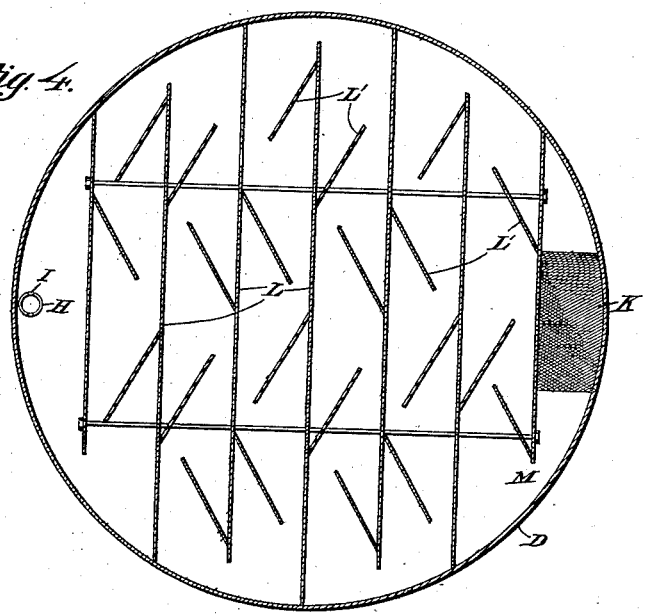
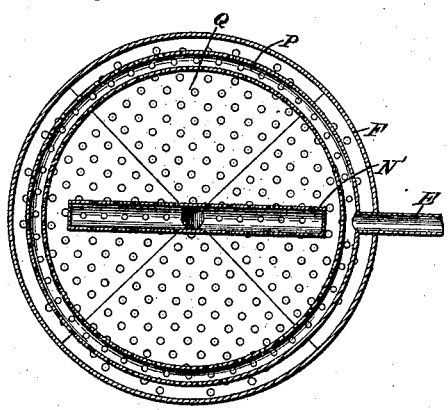
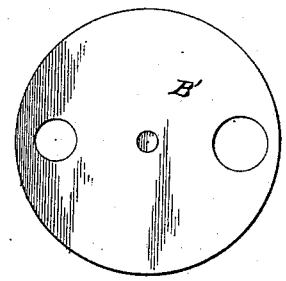
Witnesses
H. S. Austin.
Chas. W. Parker
Inventor
William P. Houze,
by F. S. Bacon
Attorney

UNITED STATES PATENT OFFICE.

WILLIAM P. HOUZE, OF PARIS, TENNESSEE.

CARBURETER.

SPECIFICATION forming part of Letters Patent No. 683,401, dated September 24, 1901.

Application filed October 16, 1900. Serial No. 33,210. (No model.)

*To all whom it may concern:*

Be it known that I, WILLIAM P. HOUZE, a citizen of the United States, residing at Paris, in the county of Henry and State of Tennessee, have invented certain new and useful Improvements in Carbureters; and I do hereby declare the following to be a full, clear, and exact description of the invention, such as will enable others skilled in the art to which it appertains to make and use the same.

This invention relates to improvements in carbureters, and it is embodied in the novel parts, arrangements, and combinations of parts hereinafter described, and particularly set forth in the claims.

The object and purpose of the present invention is to provide an apparatus with means for insuring a uniform gas at any stage of the liquid hydrocarbon.

A further object of the invention is to provide a gas-producing apparatus with an air-receptacle and air-percentage valves for generating a uniform gas at any stage of the liquid hydrocarbon.

A further object of the invention is the provision of a novel construction of carbureting-chamber whereby the maximum production of gas is obtained.

A further object of the invention is the provision in the carbureting-chamber of a series of dividing-walls to form air and gas currents, the passages between the dividing-walls being provided with suitable wicking to enable the more ready evaporation of the hydrocarbon and to furnish the maximum surface for the liquid.

A further object of the invention is to provide a novel and efficient mixer and equalizer for equalizing the quality of the gas produced.

A still further object of the invention is to construct a carbureter for generating illuminating-gas which will be simple in construction, simple in operation, cheap to manufacture, and which at the same time will be especially efficient and capable of producing a desirable illuminating-gas of uniform richness.

In the accompanying drawings I have illustrated an apparatus embodying the invention; but I desire it understood that I do not limit the invention in its useful applications to the particular construction which for the sake of an understanding of the invention is therein delineated.

Figure 1:
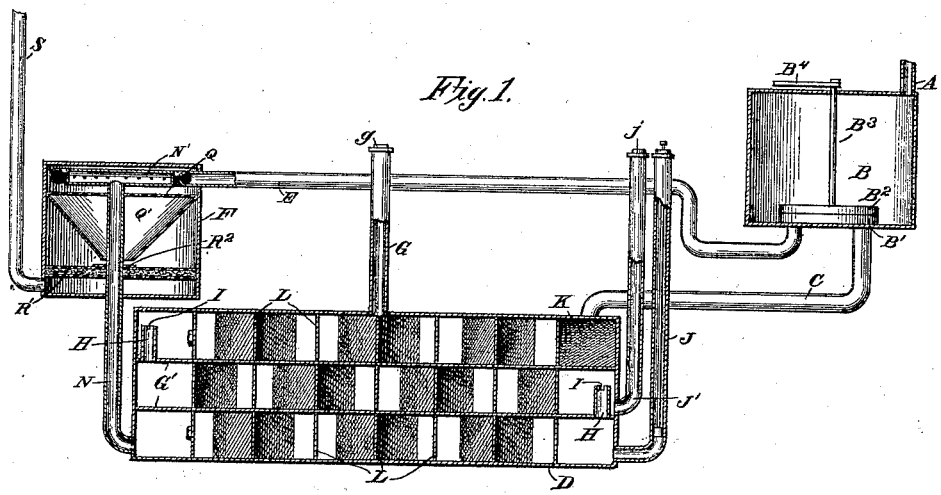
Figure 2:
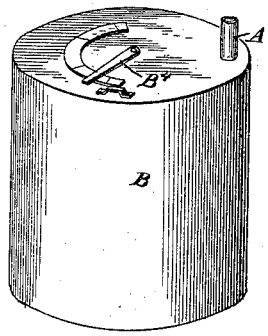
Figure 3:
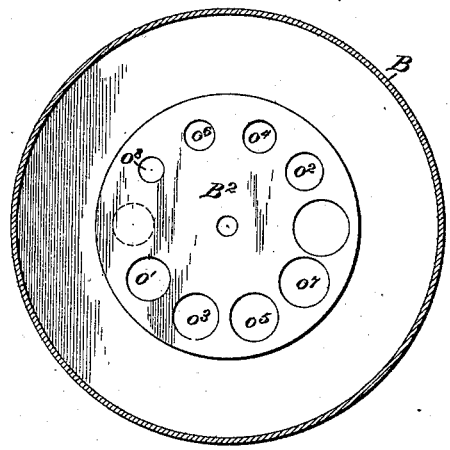
Figure 7:
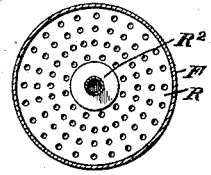

In the drawings, Figure 1 is a perspective view of an apparatus embodying my invention. Fig. 2 is a vertical sectional view through the air-receptacle, carbureting-chamber, and combined mixer and equalizer. Fig. 3 is a horizontal sectional view through the air-receptacle, showing in plan the air-percentage valve. Fig. 4 is a horizontal sectional view through the carbureting-chamber; and Fig. 5 is a horizontal sectional view through the upper portion of the mixer and equalizer, showing the air and gas pipes and mixing-partition in plan.

Referring to the drawings, wherein like reference characters refer to similar parts throughout the several views, B indicates an air-receptacle provided with an air-inlet pipe A, through which air is supplied to the receptacle B under suitable pressure by any desired or convenient means. (Not shown.)

D indicates a carbureting-chamber the upper portion of which is connected, as by means of a suitable pipe C, with the lower portion of the air-receptacle.

F represents a combined mixer and equalizer the upper portion of which is also connected, as by means of a pipe E, to the lower portion of the air-receptacle B. The carbureting-chamber is provided with a filling-pipe, (indicated at G.)

The carbureting-chamber D is divided by means of horizontal partitions G' into a plurality of compartments, each communicating with the other by means of a vertical pipe H, which does not extend to the partition or cover above and which is open at its upper end. Each pipe H is provided at its top with a small recess or notch I to allow the liquid to pass from the one compartment to the one next below through the pipe H clear of the air and gas at the commencement of the operation of the apparatus. As will be seen, the pipe C leads to the upper compartment. A vertical pipe J communicates with the lower portion of the lower compartment and a similar pipe J' communicates with the lower portion of the intermediate compartment. In the pipe J is a float provided with a vertical stem which is adapted to rise with the liquid in the compartment and indicate the amount therein. It will be understood that any desired number of horizontal compartments may be provided, in the present instance three being shown. The pipes G, J, and J' are provided with suitable closures—as, for instance, caps $g$ and $j$. The filling-tube G and the pipes J and J' will allow the residuum to be pumped from the carbureting-chamber, and they also serve as vent-pipes in filling.

L indicates vertical partitions dividing the several compartments of the carbureting-chamber into passages communicating with each other by means of restricted openings or ways M. By this construction I obtain a greater pressure to the volume, owing to the confinement of the air in the passages, and thereby the agitation of the hydrocarbon will be increased, which will produce a greater quantity of gas.

K indicates a piece of wicking which is placed in the upper compartment opposite or below the air-inlet pipe C, and in each of the passages formed between the vertical partitions L are oppositely-arranged inclined wicking-baffles which extend at an angle to the partition in such manner as to cause the air to pass in a zigzag direction through the passages. The wicking K and L by capillary attraction raise the liquid from the compartments and distribute the same over an extended surface in the path of the air, thereby insuring a very perfect commingling of the air and vapors from the hydrocarbon and insuring a freer vaporization of the hydrocarbon.

Within the air-receptacle B is a valve-seat B', provided with ports communicating with the pipes C and E to the carbureting-chamber and mixer and equalizer, respectively. As shown, these ports are at diametrically opposite points of the seat. Rotatably mounted above the seat B' is my improved percentage-valve $B^2$, which, as will be seen, is provided with a series of ports arranged equidistant from the center of rotation of the valve and adapted to the register with the ports in the seat by the turning of the valve. The valve-openings are lettered, respectively, O O' $O^2$ $O^3$ $O^4$ $O^5$ $O^6$ $O^7$ $O^8$ and are of relatively different sizes, the function of which will be hereinafter described. The valve $B^2$ is provided with a vertical stem $B^3$, projecting through the top of the air-vessel B and carrying at its upper end an index-pointer $B^4$, adapted to travel over a scale on the top of the air vessel, which is provided with indications, as shown in the drawings, to indicate the position of the valve $B^2$.

The combined mixer and equalizer is, as before stated, connected to the air vessel by means of the pipe E. The latter enters the casing of the mixer and equalizer and terminates in a circular pipe P, provided with perforations, the combined area of which perforation is equal to the area of the largest port in the valve $B^2$, opening to the mixer and equalizer.

N indicates a pipe leading from the upper portion of the lowermost compartment of the carbureting-chamber to the upper portion of the combined mixer and equalizer, where it is provided with a horizontal perforated pipe N', the combined area of the perforations of which is equal to the area of the inlet-pipe A for the air. Below the pipe N' and the pipe P' is a horizontal perforated partition Q, and from the outer edges of this partition depends an inverted-cone-shaped imperforate partition Q', forming a funnel opening at the lower central portion into the casing of the mixer and equalizer. Below the mouth of the funnel is a horizontal partition R, between which and a similar partition spaced therefrom is confined a coarse woolen cloth or the like. The central portion of the partition R, below the exit from the funnel, is imperforate, or the perforations are covered—as, for instance, by means of a plate $R^2$.

S indicates the gas-supply pipe, which leads from the lower portion of the mixer and equalizer to the burners.

In operation the carbureting-chamber will be supplied with a liquid hydrocarbon, such as gasolene, through the filling-tube G, the liquid passing into the upper compartment, from which it overflows through the conveyer-pipe H to the compartment below, which it fills to the height of the conveyer-pipe H therein, when it will overflow to the next lower compartment, and so on to succeeding compartments, if more than three are employed. The air, as will be understood, is supplied under pressure to the air-receptacle A, from which it passes through the pipes C and E to the carbureting-chamber and combined mixer and equalizer. The percentage or proportion of air supplied to the carbureting-chamber relative to that supplied to the mixer and equalizer is controlled and relatively changed by means of the percentage-valve $B^2$ in the following manner: At the commencement of the operation the index-pointer $B^4$ will be set at the point "1" on the scale, which, through the operating-stem, will turn the valve so that the port O will register with the pipe E to the mixer and equalizer and the port O' will register with the pipe C to the carbureting-chamber. The port O being of an area of, say, eighty per cent. of the area of the port O' will deliver a correspondingly large percentage of air to the mixer and equalizer, and the gas produced will be a mixture composed of eight or nine parts, more or less, of air and one or two parts of vapor, which will make a brilliant smokeless flame. After the carbureter has been in use for some time, when the gasolene becomes heavy and the same air will no longer absorb the same amount of vapor, it is necessary to increase the supply of air to the carbureting-chamber, and to do this the index-pointer is moved to the point "2" on the scale, when the port $O^2$ will open to the mixer and equalizer and the port $O^3$ to the carbureting-chamber. The port $O^2$ being, say, sixty per cent. of the area of the port $O^3$, more air will be forced to the carbureting-chamber in proportion to that supplied to the mixer and equalizer and gas of the same richness as before will be produced, thus insuring the same brilliant smokeless flame. The valve is thus from time to time, as it becomes necessary, moved to bring the ports $O^4$ and $O^5$ and $O^6$ and $O^7$, respectively, into communication with the combined mixer and equalizer and the carbureting-chamber.

In the drawings the ports O and O', $O^2$ and $O^3$, &c., are shown as diametrically opposite each other in the valve. This is not essential, it only being necessary to have the relative arrangement such that when the ports O $O^2$, &c., register with the pipe to the mixer and equalizer the ports O' $O^3$, &c., shall open to the carbureting-chamber. It will be seen that the combined area of the ports opened to the carbureting-chamber and the mixer and the equalizer is the same as the area of the inlet-pipe A to the air-receptacle. When it is necessary after a continued use of the apparatus to supply all of the air to the carbureting-chamber, the valve is turned to bring the port $O^8$ into registration with the pipe C. In this position of the valve the pipe E is closed and no air passes to the mixer and equalizer.

The air and vapor which is very thoroughly mixed and commingled in the carbureting-chamber by passing through the various passages and into contact with the wicking, as before recited, passes to the mixer and equalizer, into which it is discharged in small jets through the perforations in the pipe N' and mixed with the air entering through the perforations in the pipe P. The mixture will be more thoroughly mixed and equalized by being forced by the pressure through the perforated partitions Q, after which it is contracted and concentrated by the conical partition Q' and then passed through the partitions and interposed woolen material, which insures a final mixing and scrubbing of the gas.

In case there is any liquefaction of the gas in the supply-pipe S, owing to a change in temperature, the liquid will flow through the pipe S to the bottom of the mixer and the equalizer, from which it will pass through the opening G into the carbureting-chamber.

Having thus described my invention, what is claimed, and desired to be secured by Letters Patent, is—

1. In a carbureter, the combination of a carbureting-chamber, a mixer and equalizer, an air-receptacle in the air-supply to the carbureting-chamber communicating with the mixer and equalizer, and means in the air-receptacles for relatively increasing the supply of air to the carbureting-chamber and decreasing the supply to the mixer and equalizer, substantially as described.

2. In a carbureter, the combination of a carbureting-chamber, a mixer and equalizer, an air-receptacle in the air-supply to the carbureting-chamber communicating with the mixer and equalizer, and a valve located in the air-receptacle controlling the communications with the carbureting-chamber and with both the mixer and equalizer and adapted to relatively increase the supply of air to the carbureting-chamber and decrease the supply to the mixer and equalizer substantially as described.

3. In a carbureter the combination of a carbureting-chamber, a mixer and equalizer, an air-supply communicating with both the carbureting-chamber and the mixer and equalizer, and a single mechanism for controlling the communication of the air-supply with both the carbureting-chamber and the mixer and equalizer, whereby upon the operation of the single controlling mechanism the supply to the carbureting-chamber can be relatively decreased and the supply to the mixer and equalizer relatively increased, substantially as described.

4. In a carbureter, the combination of a carbureting-chamber, a mixer and equalizer, an air-receptacle communicating with the carbureting-chamber and with the mixer and equalizer, a rotatable valve in said air-receptacle having a plurality of pairs of ports, and adapted by the rotation thereof, to cause one port of a pair to register with the communication to the carbureting-chamber and the other port of the pair to register with the communication with the mixer and equalizer, and means for indicating the position of the valve, substantially as described.

In testimony whereof I affix my signature in presence of two witnesses.

WILLIAM P. HOUZE.

Witnesses:
A. B. CULLOM,
J. N. SMITH.